United States Patent
Leroux

(10) Patent No.: US 9,878,483 B2
(45) Date of Patent: Jan. 30, 2018

(54) CLAMP FOR GRIPPING A HOLLOW BODY SUCH AS A CONTAINER PREFORM OR A CONTAINER

(71) Applicant: SIDEL PARTICIPATIONS, Octeville-sur-Mer (FR)

(72) Inventor: Julien Leroux, Le Havre (FR)

(73) Assignee: Sidel Participations, Octeville-sur-Mer (FR)

( * ) Notice: Subject to any disclaimer, the term of this patent is extended or adjusted under 35 U.S.C. 154(b) by 0 days.

(21) Appl. No.: 15/381,737

(22) Filed: Dec. 16, 2016

(65) Prior Publication Data

US 2017/0173843 A1 Jun. 22, 2017

(30) Foreign Application Priority Data

Dec. 16, 2015 (FR) .................................. 15 62496

(51) Int. Cl.
| | |
|---|---|
| *B29C 49/42* | (2006.01) |
| *B65G 47/86* | (2006.01) |
| *B29K 105/00* | (2006.01) |
| *B29K 659/00* | (2006.01) |
| *B29L 31/00* | (2006.01) |

(52) U.S. Cl.
CPC ........ *B29C 49/4205* (2013.01); *B65G 47/847* (2013.01); *B29K 2105/258* (2013.01); *B29K 2659/00* (2013.01); *B29L 2031/712* (2013.01)

(58) Field of Classification Search
CPC .............. B29C 49/4205; B65G 47/847; B29K 2105/258

USPC ........ 294/202, 203, 115, 116, 99.1, 198, 90; 269/32, 34; 198/803.3, 803.9, 470.1
See application file for complete search history.

(56) References Cited

U.S. PATENT DOCUMENTS

| | | | | |
|---|---|---|---|---|
| 3,012,811 A | * | 12/1961 | Sandrock | G21C 19/10 294/110.1 |
| 4,348,044 A | * | 9/1982 | Wood, III | B23Q 7/043 294/115 |
| 5,072,652 A | * | 12/1991 | Blatt | B25J 15/0206 294/115 |
| 5,893,700 A | * | 4/1999 | Kronseder | B08B 9/426 198/803.9 |

(Continued)

FOREIGN PATENT DOCUMENTS

| | | | |
|---|---|---|---|
| DE | 102011117622 | * | 5/2013 |
| EP | 1 375 395 A1 | | 1/2004 |

(Continued)

OTHER PUBLICATIONS

French Preliminary Search Report, dated Aug. 9, 2016, from corresponding French Application.

*Primary Examiner* — Paul T Chin
(74) *Attorney, Agent, or Firm* — Young & Thompson

(57) ABSTRACT

Clamp (9) for gripping a hollow body (2), which includes a clamp body (12), a pair of jaws (13) mounted articulated relative to the clamp body (12) around respective axes (A1, A2) of rotation that are parallel, and a magnetic return device (17) of the jaws (13), including a pair of magnets (18, 19) in magnetic opposition, with magnetic axes that are parallel to the axes of rotation of the jaws (13), able to draw, by opening or by closing, the clamp (9), thus having two stable positions, open and closed, in which the magnets (18, 19) are off-axis.

16 Claims, 7 Drawing Sheets

(56) References Cited

U.S. PATENT DOCUMENTS

| | | | |
|---|---|---|---|
| 8,128,142 B2* | 3/2012 | Glotzl | B65G 47/847 198/803.9 |
| 8,167,607 B2* | 5/2012 | Linke | B29C 49/4205 198/470.1 |
| 8,297,671 B2* | 10/2012 | Knieling | B65G 47/847 294/198 |
| 8,419,097 B2* | 4/2013 | Lunde | E21B 19/14 294/115 |
| 8,465,070 B2* | 6/2013 | Knieling | B65G 47/847 294/198 |
| 8,894,114 B2* | 11/2014 | Fahldieck | B65G 47/847 198/407 |
| 9,022,442 B2* | 5/2015 | Rousseau | B29C 49/4205 294/106 |
| 2008/0272609 A1* | 11/2008 | Knieling | B65G 47/847 294/90 |
| 2010/0007160 A1* | 1/2010 | Glotzl | B65G 47/847 294/203 |
| 2011/0198198 A1 | 8/2011 | Michel | |
| 2013/0193702 A1* | 8/2013 | Fahldieck | B65G 47/847 294/199 |
| 2014/0008927 A1 | 1/2014 | Rousseau et al. | |
| 2014/0175819 A1* | 6/2014 | Wilson | B25J 15/0028 294/198 |
| 2014/0232126 A1* | 8/2014 | Schulnig | B65G 47/847 294/203 |

FOREIGN PATENT DOCUMENTS

| | | |
|---|---|---|
| EP | 1 867 600 A1 | 12/2007 |
| EP | 2 360 109 A1 | 8/2011 |
| EP | 2 686 259 A1 | 1/2014 |
| EP | 2 881 345 A1 | 6/2015 |
| WO | 2012/1234566 A1 | 9/2012 |
| WO | 2013/064198 A1 | 5/2013 |
| WO | WO2013064198 * | 5/2013 |

* cited by examiner

CLAMP FOR GRIPPING A HOLLOW BODY SUCH AS A CONTAINER PREFORM OR A CONTAINER

BACKGROUND OF THE INVENTION

Field of the Invention

The invention relates to the transport of hollow bodies and more particularly to the transport of preforms in a production line of containers made of plastic material (such as bottles, jars, cans) or to the transport of the containers themselves.

More specifically, the invention relates to a clamp for gripping a hollow body, intended typically to be mounted on the periphery of a transfer wheel. Such a clamp is generally equipped with a pair of jaws that can move between a gripping position in which the jaws are brought together to hold (and suspend) the hollow body, and a release position in which the jaws are separated to allow the release of the hollow body.

Considering the speed of rotation of the wheel, proportional to the rate of production (of several tens of thousands of containers per hour currently, which represents several thousands of opening-closing cycles for each clamp), the clamp must comply with a strict number of specifications:

the hollow body must be held both firmly and without risk of damage, the opening and closing movements of the clamp must be performed smoothly, the mass of the clamp must be contained, so as to limit the inertia of the wheel.

Description of the Related Art

Numerous models of clamps are known.

Thus, a first known type of clamp is equipped with a spring that draws the clamp into a closed position, and with a roller that circulates on a cam track, which, by means of a link rod transmission mechanism (see, for example, EP 2 686 259 or its U.S. equivalent US 2014/008927, both in the name of Sidel) or gear transmission mechanism (see, for example, EP 1 867 600, also in the name of Sidel), controls the opening of the jaws in opposition to the return force of the spring.

This first type of clamp has proven itself but it is not, however, without drawbacks, mainly linked to the presence of the spring. First, the spring encumbers the clamp. Then, the numerous repeated compression and expansion forces (several tens of thousands of cycles per production day) bring about a mechanical fatigue that can cause a spring to break. Finally, it is complicated to design the spring well, which spring must be stiff enough to make possible a rapid closing of the clamp (necessary to prevent the hollow body from escaping, but at the cost of a higher mass), while being flexible enough to facilitate the introduction of the hollow body (necessary to limit the dangers of scratches or of damage to the hollow bodies, at the cost of greater operational slowness, which can reduce rates).

A second type of clamp, known from the document WO 2013/064198A1 (KHS), eliminates the transmission mechanism by substituting for it a sliding ejector that is provided with magnets that, placed opposite magnets that are in magnetic opposition integrated with the jaws, draw these toward their release position.

This second type of clamp has the advantage of facilitating the opening of the clamp thanks to the magnets in magnetic opposition, but it does not, however, eliminate a return spring that draws the jaws toward their gripping position. The problems cited above are therefore not solved.

SUMMARY OF THE INVENTION

A first objective is to lighten the clamps for gripping the hollow bodies.

A second objective is to improve the reliability of the clamps for gripping the hollow bodies.

A third objective is, more specifically, to propose a gripping clamp that is free of a spring (i.e., a mechanical element for elastic return).

For this purpose, a clamp is proposed for gripping a hollow body, which comprises:

a clamp body;

a pair of jaws mounted articulated in relation to the clamp body around respective parallel axes of rotation, between a release position in which the jaws are separated from one another to accommodate or release a hollow body and a gripping position in which the jaws are brought close to one another and define a housing for the hollow body so as to grip it;

a magnetic return device comprising at least one pair of magnets in magnetic opposition, able to draw the jaws toward their release position or, conversely, toward their gripping position;

in this clamp:

the magnetic return device comprises at least one fixed magnet that is integral with the clamp body, having a magnetic axis that is parallel to the axis of rotation of the jaws, and at least one movable magnet that is coupled to at least one of the jaws, having a magnetic axis that is parallel to the axis of rotation of the jaws;

each movable magnet can be moved in relation to the clamp body between a first end position in which the movable magnet is off-axis in relation to the fixed magnet and draws at least one jaw toward its gripping position, and a second end position in which the movable magnet is off-axis in relation to the fixed magnet in a direction that is opposite to the first end position and draws at least this jaw toward its release position.

Thanks to this structure, and in particular thanks to the design of the magnetic return device, the clamp lacks a spring. A lightening of the clamp results, to the benefit of the inertia of the wheel that is equipped with it, to the benefit of its reliability (no breaking of a spring) and to the benefit of the rate of production that can be accelerated.

Various additional characteristics can be foreseen, individually or in combination:

the clamp comprises
  an actuator carrying the movable magnet, this actuator being movable in translation relative to the clamp body between a retracted position, corresponding to the gripping position of the jaws, in which the actuator is retracted in relation to the housing, and a deployed position, corresponding to the release position of the jaws, in which a front end of the actuator projects into the housing;
a pair of link rods each coupling a jaw to the actuator.
each link rod is, by an outer end, articulated relative to a jaw and, by an inner end, articulated relative to the actuator;
the magnetic return device comprises a pair of fixed magnets that are placed on either side of the actuator, opposite to the movable magnet;
the movable magnet is spherical;
by their inner ends, the link rods are articulated relative to the actuator around a common axis;
the clamp comprises a roller integral with the actuator, able to work with a cam;

each jaw carries a movable magnet and is integral with a lever that, in the gripping position of the jaw, is retracted relative to the housing and that, in the release position of the jaw, projects into the housing.

BRIEF DESCRIPTION OF THE DRAWINGS

Other objects and advantages of the invention will come to light from the description of an embodiment, provided below with reference to the accompanying drawings in which.

DETAILED DESCRIPTION OF THE PREFERRED EMBODIMENTS

Figure 1:
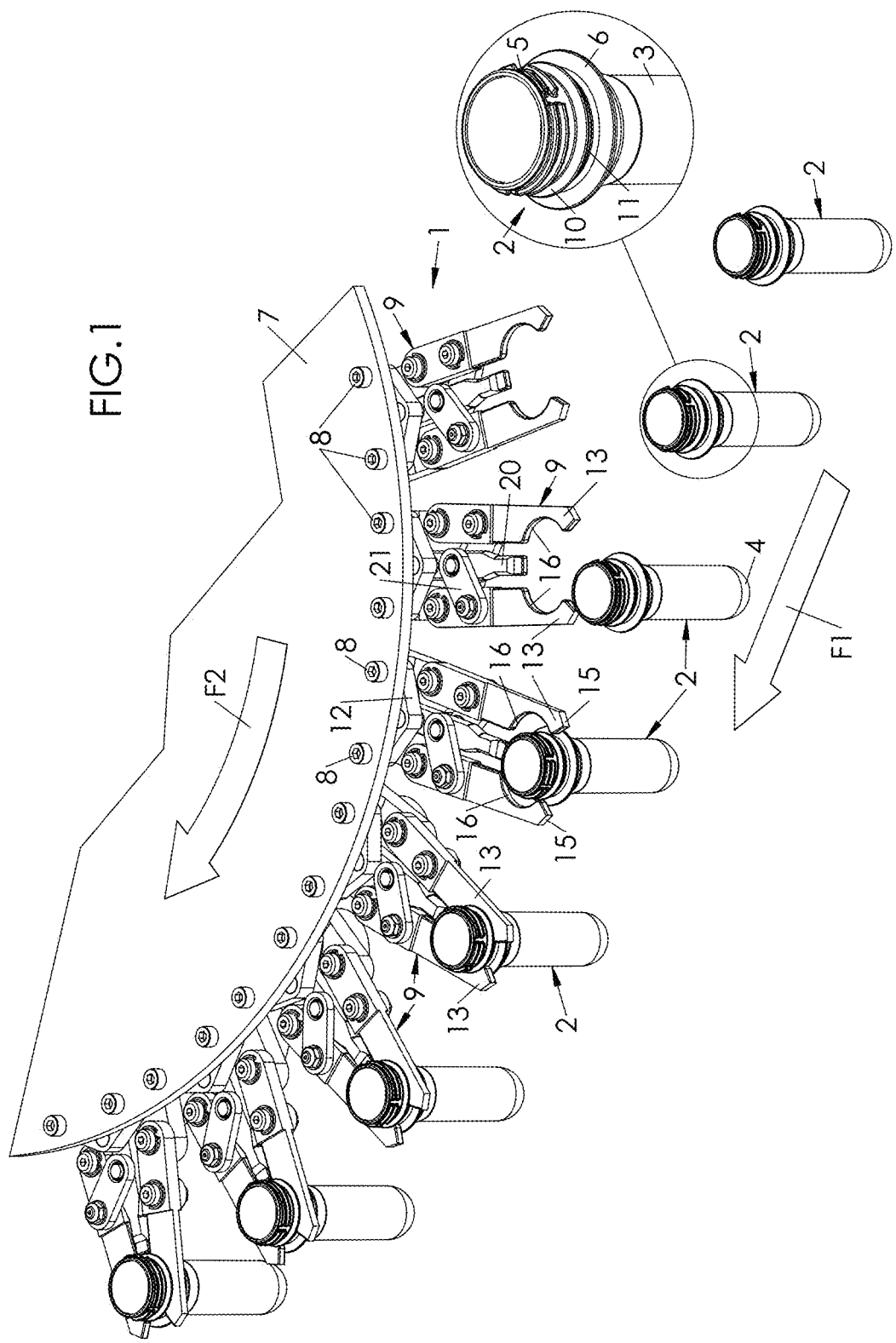
FIG. 1 is a perspective view of a transfer wheel equipped, on its periphery, with a series of gripping clamps.

In FIG. 1, a wheel 1 is shown for transfer of a hollow body 2 that is incorporated into a production line of containers. Hereinafter, the hollow bodies 2 that are shown are preforms, from which containers must be formed by blow molding or stretch blow molding, the wheel being, for example, a wheel for bringing preforms into a blower. The reference 2 will be used below to designate one or more preform(s), but the wheel 1 could be used to transport other types of hollow bodies, for example intermediate containers (blanks) or completely formed containers at their exit from a blower.

Each preform 2 comprises a cylindrical body 3 that is closed by a hemispherical bottom 4, and, opposite to the bottom 4, an open neck 5 that is separated from the body 3 by a collar 6 that projects radially.

As is seen in FIG. 1, the wheel 1 comprises a disk 7 on the periphery of which are mounted (by being attached, for example, by means of screws 8) regularly spaced clamps 9, configured to grab the preforms 2 by their necks 5. According to an embodiment illustrated in FIG. 1, each preform 2 is provided with a peripheral ridge 10 above the collar 6 and which defines with it a groove 11 intended to accommodate a tamper-proof ring that is integrated with a sealing cap of the container once filled. This groove 11 is, in the example illustrated, used to perform the grabbing of the preforms 2. In another mode of use (not shown), the clamp can grab the preform under the collar 6 (located under the neck 5).

Each clamp 9 comprises, firstly, a clamp body 12 by which the clamp 9 is attached to the disk 7 of the wheel 1 by means of screws 8. The clamp body 12 is advantageously made from a high-performance aluminum alloy or from a high-performance plastic material, particularly from a polyacetal, typically of polyoxymethylene (POM).

Figure 2:
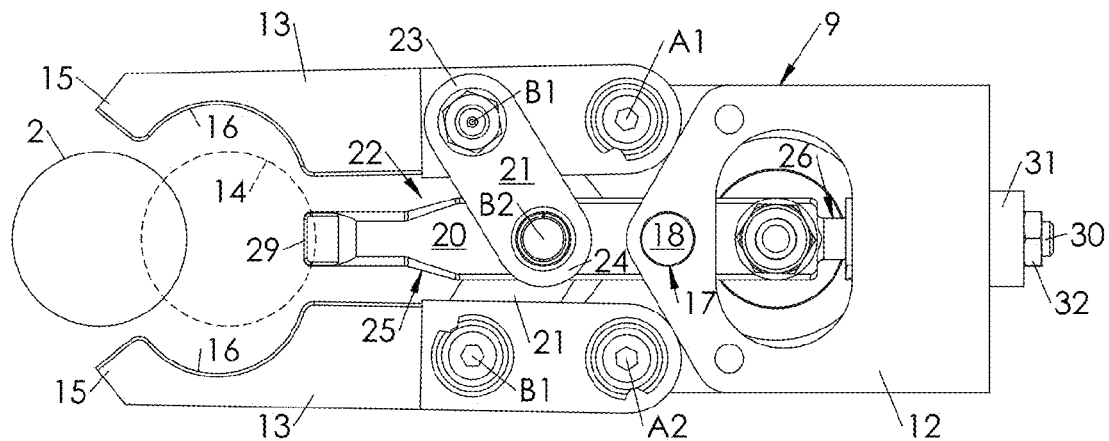
FIG. 2 is a top view of a gripping clamp, shown in open configuration, jaws separated.
Figure 3:
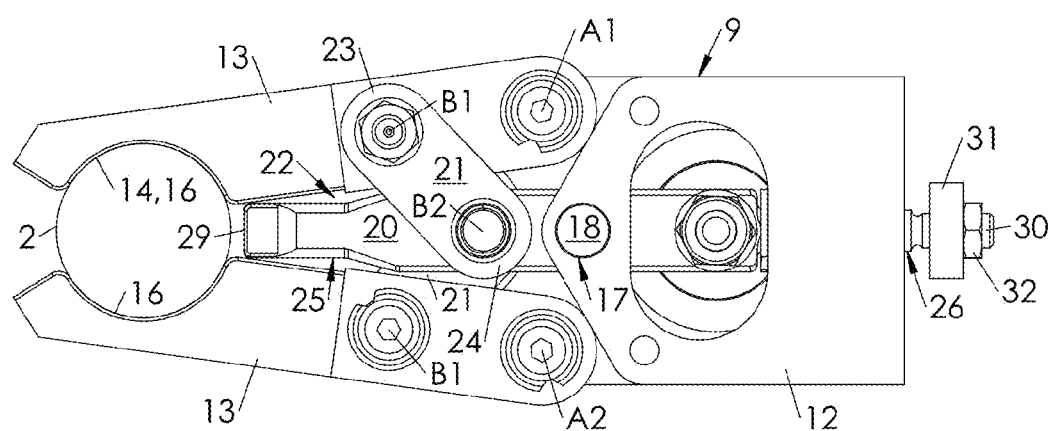
FIG. 3 is a similar view to FIG. 2, showing the clamp in closed configuration, jaws brought close together.
Figure 4:
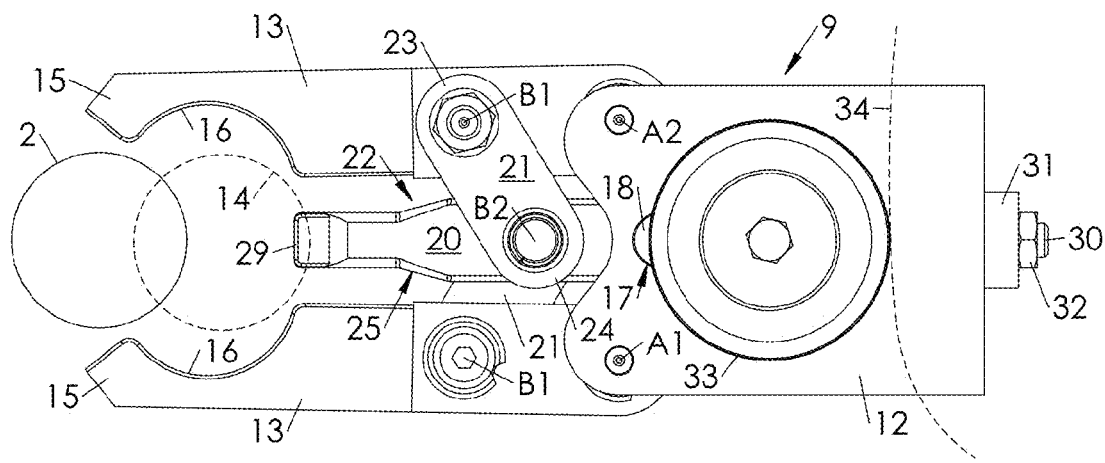
FIG. 4 is a bottom view of the clamp of FIG. 2, in open configuration.
Figure 5:
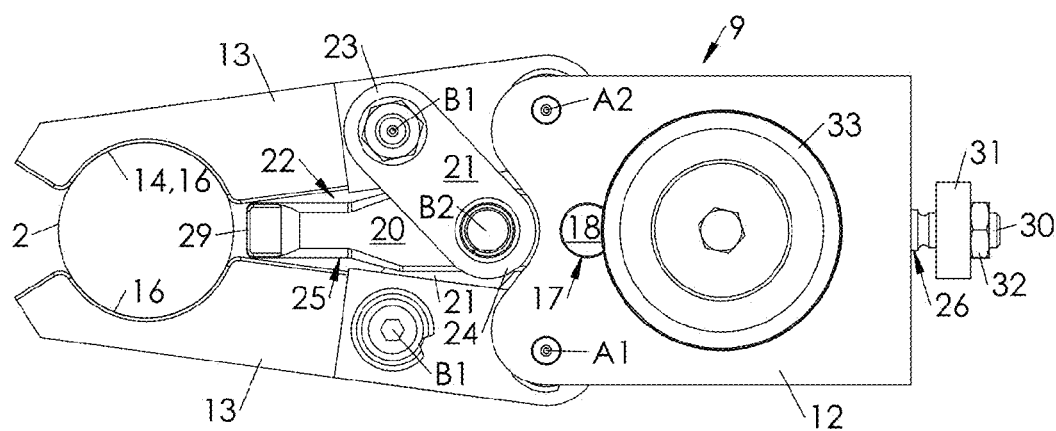
FIG. 5 is a bottom view of the clamp of FIG. 3, in closed configuration.

The clamp 9 comprises, secondly, a pair of jaws 13 that are mounted articulated in relation to the clamp body 12 around respective parallel axes A1, A2 of rotation, between:

a release position (on the right in FIG. 1; FIG. 2; FIG. 4), in which the jaws 13 are separated from one another to accommodate a preform 2 at a loading point and to release it at an unloading point;

a gripping position (on the left in FIG. 1; FIG. 3; FIG. 5) in which the jaws are brought close to one another and define a housing 14 for the preform 2 so as to grip it from the loading point and up to the unloading point.

The housing 14 that is defined by the jaws 13 in the gripping position is adapted to the contour of the zone for grabbing the preform 2. In this particular case, this contour is circular: it is therefore by a circle that the housing 14 has been shown in FIGS. 2 and 4 (in dotted lines) and in FIGS. 3 and 5 (in a solid line, merged with the contour of the zone for grabbing the preform 2). For this purpose, each jaw 13 has, on the side of a front end 15, a recess 16 in the shape of an arc whose radius corresponds to that of the preform 2 in the area of its neck 5 (or under its collar 6).

The jaws 13 are advantageously made from a metal material, for example of steel or from an aluminum alloy.

The clamp 9 comprises, thirdly, a magnetic return device 17 that includes at least one pair of magnets 18, 19 in magnetic opposition, able to draw the jaws 13 toward their gripping position or, conversely, toward their release position, as will be seen below.

More specifically, the magnetic return device 17 comprises:

at least one fixed magnet 18, integral with the clamp body 12, whose magnetic poles are respectively and arbitrarily denoted N (north) and S (south) and that have a primary magnetic axis M1 (N-S) that is parallel to the axis A1 (or A2) of rotation of the jaws 13, at least one magnet 19 that can be moved relative to the clamp body 12 by being coupled to at least one of the jaws 13 (i.e., the movement of the movable magnet 19 is coupled to that of this jaw 13), having a secondary magnetic axis M2 (N-S) that is parallel to the axis A1 (or A2) of rotation of the jaws 13 (and therefore to the magnetic axis M1 of the fixed magnet 18).

Each movable magnet 19 can be moved, relative to the clamp body 12 (and therefore relative to the fixed magnet 18), between:

a first end position in which the movable magnet 19 is off-axis in relation to the fixed magnet 18 and draws the jaw (or jaws) 13 toward the release position, and a second end position in which the movable magnet 19 is off-axis in relation to the fixed magnet 18 in a direction that is opposite to the first end position and draws the at least one jaw (or jaws) 13 toward the gripping position.

According to a first embodiment, illustrated in FIGS. 2 to 9, the clamp 9 comprises an actuator 20 that carries the movable magnet 19, and a pair of link rods 21 each coupling a jaw 13 to the actuator 20. The actuator 20 and the link rods 21 thus form together a transmission mechanism 22 controlling the opening and closing of the jaws 13.

More specifically, each link rod 21 is, by an outer end 23, articulated to a jaw 13 around an outer axis B1 that is parallel to the axis A1 (or A2) of articulation of the jaw 13, and, by an inner end 24, articulated relative to the actuator 20 around an inner axis B2 that is parallel to the outer axis B1.

Figure 6:
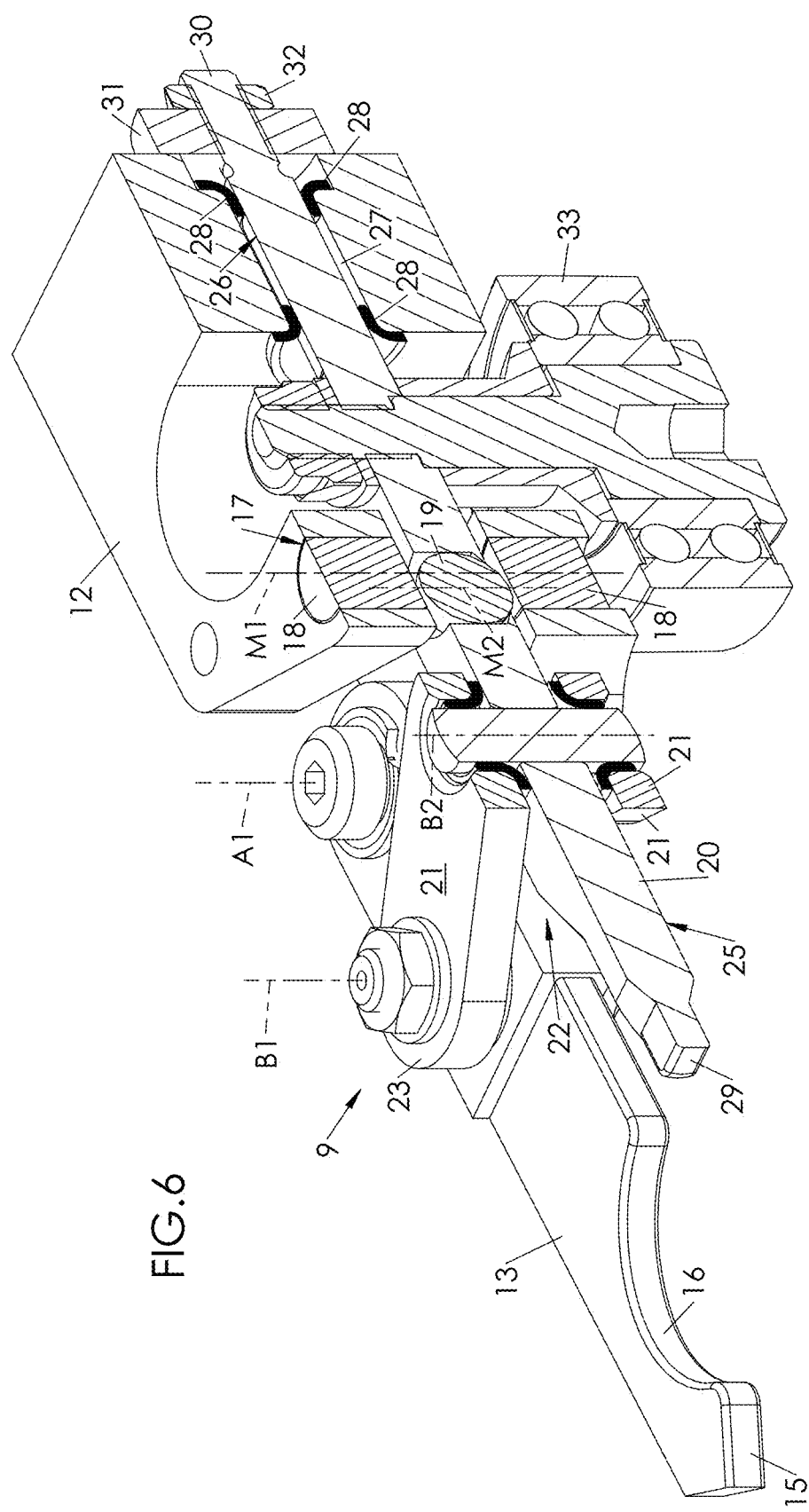
FIG. 6 is a cutaway perspective view, showing the clamp of FIG. 2 in open configuration.
Figure 7:
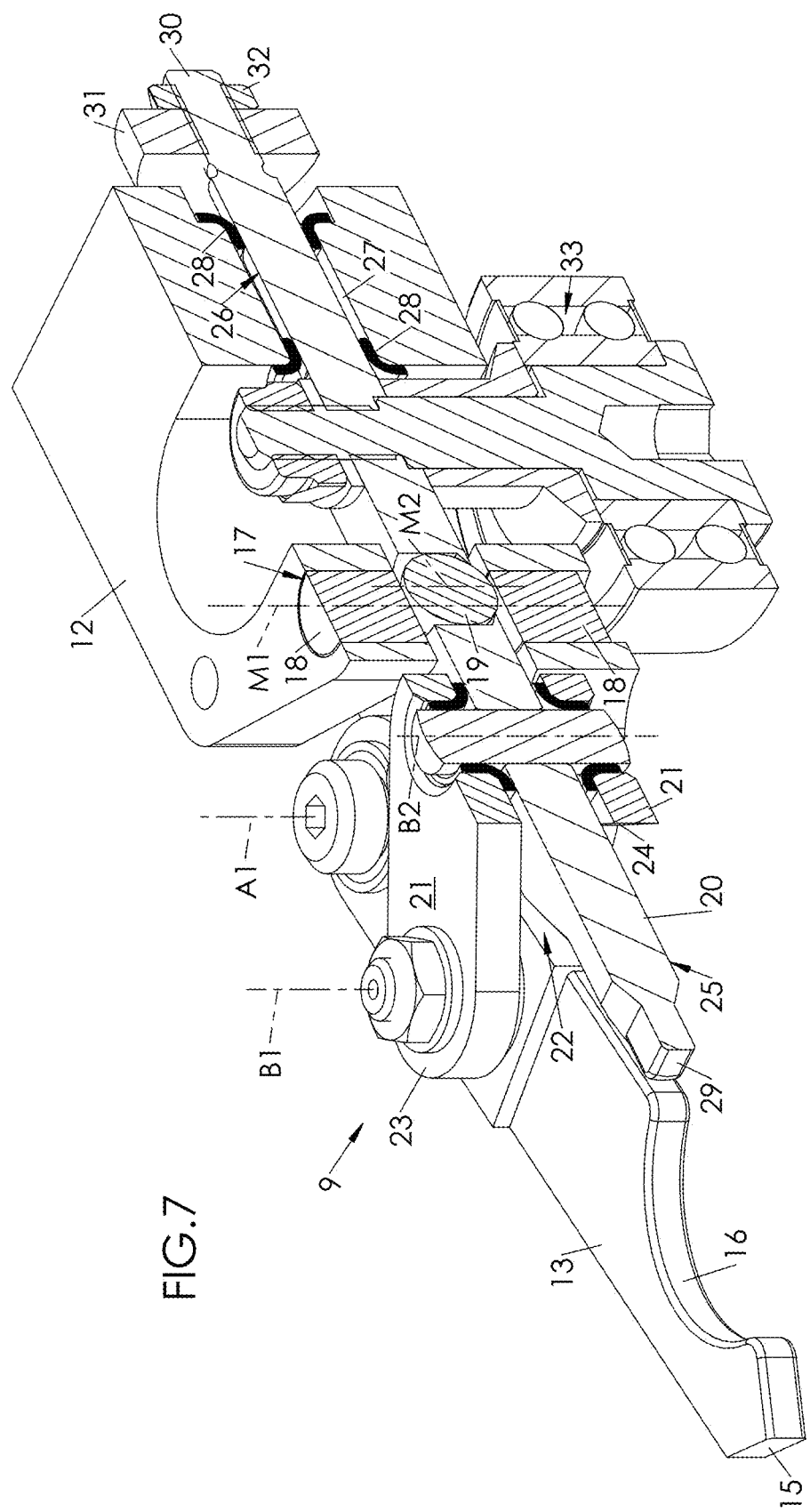
FIG. 7 is a cutaway perspective view, showing the clamp of FIG. 3, in closed configuration.

According to a preferred embodiment, illustrated in FIGS. 6 and 7, the inner axis B2 is common to the two link rods 21. In this case, and as can be seen in FIGS. 6 and 7, the link rods 21 are advantageously placed on either side of the actuator 20, through which the inner axis B2 passes (which, in practice, appears in the form of a pin).

In the example illustrated, the actuator 20 appears in the form of a rod, advantageously made from a metal material (for example of steel or from an aluminum alloy). The actuator 20 has a front section 25 that extends between the jaws 13 and on which are articulated the link rods 21, and a distal section 26 by which the actuator 20 is mounted to slide in a bore 27 formed in the clamp body 12 with, preferably, interposing of wear rings 28 made from a material having a low coefficient of friction, for example brass.

The actuator 20 is thus mounted to be able to move in translation relative to the clamp body 12 between:

a deployed position, corresponding to the release position of the jaws 13 (FIG. 2), in which the movable magnet 19 is in its first end position and in which a front end 29 of the actuator projects into the housing 14;

a retracted position, corresponding to the gripping position of the jaws 13, in which the movable magnet 19 is in its second end position and in which the actuator 20 is retracted relative to the housing 14.

As is clearly seen in FIGS. 2 to 5, the actuator 20 carries, at a distal end 30 that projects from the clamp body opposite to the front end 29, a washer 31 that is secured by a nut 32. This washer 31, with a diameter that is greater than that of the bore 27, forms an end-of-travel stop that unilaterally locks the actuator 20 in the deployed position, which in turn unilaterally locks the jaws 13 in the release position (FIGS. 2, 4, 6).

Figure 8:
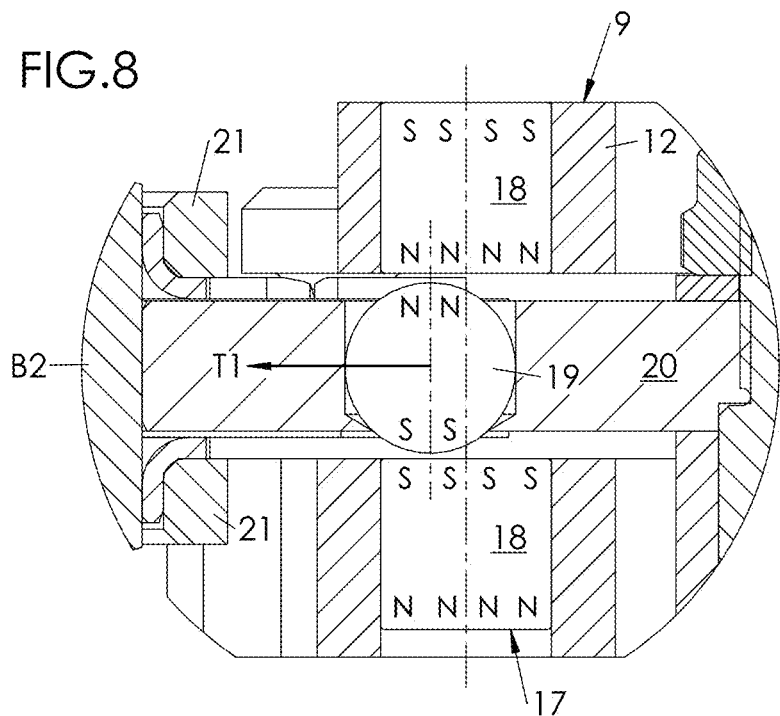
FIG. 8 is a cutaway detail view illustrating the magnetic return device in open configuration of the clamp.

It is seen in FIGS. 6 and 8 that, in this position, the secondary magnetic axis M2 is offset from the primary magnetic axis M1 in the direction of the front end 29 of the actuator 20, i.e., in the direction of the jaws 13. Taking into account this offsetting and the magnetic opposition in which the magnets 18, 19 find themselves (their poles of the same sign facing each other), the movable magnet 19 is subjected to a force having not only a component that is parallel to the magnetic axes M1, M2 (axial component), but also a component that is perpendicular to the axes M1, M2 (so-called transverse component), directed in the direction of the offsetting of the secondary magnetic axis M2 relative to the primary magnetic axis M1, i.e., in this particular case, in the direction that facilitates the opening of the jaws 13.

According to a preferred embodiment that is illustrated in FIGS. 6 and 8, the magnetic return device 17 comprises a pair of fixed magnets 18 that are integral with the clamp body 12, placed on either side of the actuator 20, opposite to the movable magnet 19 and in magnetic opposition to it. These two fixed magnets 18 are advantageously identical and coaxial and are spaced apart from the movable magnet 19 by the same air gap.

In this case, the axial components of the forces exerted by the fixed magnets 18 on the movable magnet 19 cancel each other out, since they are of the same value and of opposite directions (thus balancing the movement of the actuator), while the transverse components are added together to form an overall transverse component T1 that increases the useful drive force exerted on the actuator 20.

In the retracted position, the actuator 20 is, conversely, locked unilaterally by the jaws 13, themselves locked unilaterally in the gripping position by the preform 2 that they clamp.

Figure 9:
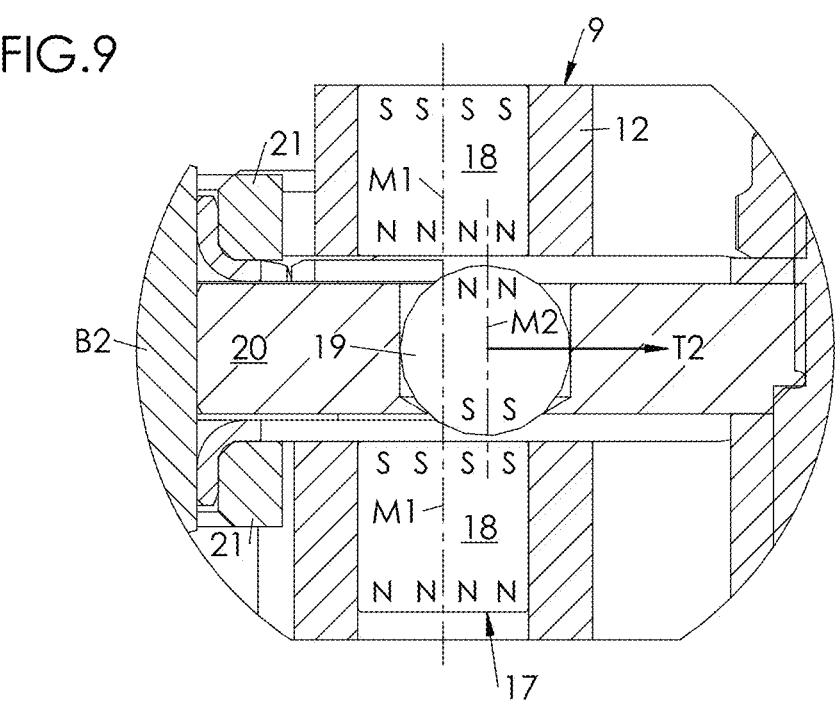
FIG. 9 is a similar view to FIG. 8, showing the magnetic return device in closed configuration of the clamp.

It is seen in FIGS. 7 and 9 that, in this position, the secondary magnetic axis M2 is offset from the primary magnetic axis M1 in the direction of the distal end 30 of the actuator 20, i.e., opposite to the jaws 13. Taking into account this offsetting and the magnetic opposition in which the magnets 18, 19 find themselves (their poles of the same sign, N, or S, facing each other), the movable magnet 19 is subjected to a force having not only a component that is parallel to the axes M1, M2 (axial component), but also a component that is perpendicular to the axes M1, M2 (transverse component), directed in the direction of the offsetting of the secondary magnetic axis relative to the primary magnetic axis M1, i.e., in this particular case, in the direction that facilitates the closing of the jaws 13.

Just as before, in the case where, as in the example illustrated, the magnetic return device 17 comprises a pair of fixed magnets 18 that are integral with the clamp body 12, placed on either side of the actuator 20, opposite to the movable magnet 19 and in magnetic opposition to it, the axial components of the forces exerted by the fixed magnets 18 on the movable magnet 19 cancel each other out, since they are of the same value and of opposite directions, while the transverse components are added together to form an overall transverse component T2 that increases the useful drive force exerted on the actuator 20.

Thus, the magnetic return device 17 exerts on the actuator 20 (and therefore on the jaws 13):

in the release position of the jaws 13, a return force that tends to open them; consequently, the release position is stable, the washer 31 ensuring the unilateral locking of the actuator 20 (and therefore of the jaws 13) in this position;

in the gripping position of the jaws 13, a return force that tends to tighten them; consequently, this position also is stable, with the preform 2 ensuring the unilateral locking of the jaws 13 (and therefore of the actuator 20) in this position.

Thus, the clamp 9 is bi-stable: stable in the release position of the jaws 13 and stable in the gripping position. The magnetic return device 17 thus acts as a coaxial return spring torque that would be alternately activated/blocked.

The reversal of the direction of the return force exerted on the actuator 20 (via the movable magnet 19) occurs when the magnetic axis M1 and the magnetic axis M2 are momentarily combined during the (forced) passage of the actuator 20 from its deployed position to its retracted position, or vice versa. The (unstable) position of the actuator 20 where the magnetic axis M1 and the magnetic axis M2 are combined is termed "dead point."

It is advantageous to facilitate the instability of the dead point, so as to limit the forces that must be exerted on the actuator 20 to force its passage from its deployed position to its retracted position and vice versa. For this purpose, it is advantageous that the movable magnet 19 be spherical, which limits the peak of transverse force in the vicinity of the dead point (axes M1, M2 almost combined) while having a slight impact on the value of the forces exerted on the actuator 20 by the magnetic return device 17 in the retracted or deployed position.

Starting from the release position, the closing of the jaws 13 is caused by the pressing of the preform 2 against the front end 29 of the actuator 20. This is designed so that its front end 29 projects into the housing 14 by a distance that is greater than the offsetting of the secondary magnetic axis M2 relative to the primary magnetic axis M1. In this way, when the preform 2 is correctly positioned in its housing 14, the actuator 20 has passed its dead point and is drawn toward its retracted position by the return force exerted by the magnetic return device 17, which, by way of the transmission mechanism 22, tightens the jaws in the gripping position around the preform 2.

Conversely, starting from the gripping position, the actuator 20 is separated from its retracted position until passing the dead point. Consequently, the return force that is exerted by the magnetic return device 17 on the actuator 20 tends to move it toward its deployed position. Whereas, by way of the transmission mechanism 22, the jaws 13 are separated toward their release position, the front end 29 of the actuator 20 penetrates into the housing 14 and pushes the preform 2 to facilitate its ejection from the clamp 9.

For this purpose, the clamp 9 is advantageously equipped with a roller 33 that is integral with the actuator 20, able to work with a cam 34 (diagrammed in dotted lines in FIG. 4), positioned locally in the vicinity of the point of release from the wheel 1.

This cam 34 remains of small size, however, since the clamp 9 is stable in its two positions, open (corresponding to the release position of the jaws 13) and closed (corresponding to the gripping position of the jaws 13). Therefore, it is not necessary to have a cam track running over the entire periphery of the wheel 1.

Each preform 2 arriving tangentially (in the direction indicated in FIG. 1 by the arrow F1) at the point of loading is positioned between the open jaws 13 of a clamp 9 according to the rotation of the wheel (in the direction indicated in FIG. 1 by the arrow F2). The pressing of the preform 2 against the front end 29 of the actuator 20 then causes, as described above, the closing of the jaws 13 on the preform 2 and its immobilization in the clamp 9.

Various modifications can be provided to the clamp 9 that has just been described. In particular, to increase the forces exerted on the jaws 13 particularly in the gripping position, it is conceivable to equip it with at least two movable magnets (and at least as many corresponding fixed magnets). A series of movable magnets 19 can thus be mounted in the actuator 20, and a series of fixed magnets 18, in magnetic opposition to the movable magnets 19, can be mounted in the clamp body 12.

Figure 10:
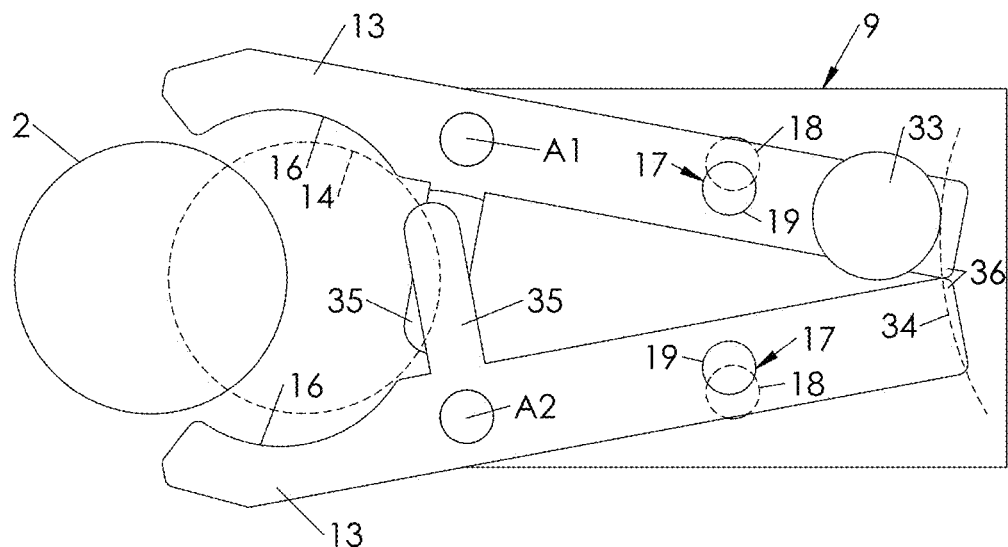
FIG. 10 is a diagrammatic top view illustrating a gripping clamp according to another embodiment, shown in open configuration, jaws separated.
Figure 11:
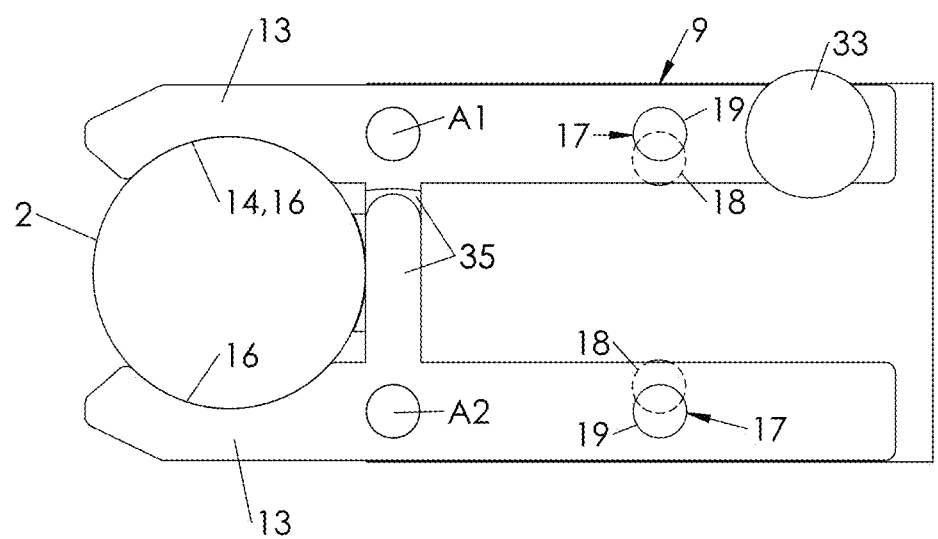
FIG. 11 is a view similar to FIG. 10, showing the clamp in closed configuration, jaws brought close together.

According to a second embodiment, illustrated in FIGS. 10 and 11, the clamp 9 lacks a sliding actuator 20; each jaw 13 carries a movable magnet 19 and is integral with a lever 35 that, in the gripping position of the jaw 13, is retracted relative to the housing 14 and that, in the release position of the jaw 13, projects into the housing 14.

In the example illustrated, the levers 35 overlap, the preform 2 pushing them together when it is positioned in its housing 14. In this example, the levers 35 extend into the extension of the axes A1, A2 of rotation of the jaws 13, but they could be offset in relation to them.

The clamp body 12 incorporates a fixed magnet 18 opposite each movable magnet 19, in magnetic opposition to it. The path of the movable magnets 19 is circular but, in view of its slight angular amplitude in relation to the distance between the axis A1 (or A2) of rotation of the jaw 13 and the movable magnet 19, this path can be considered quasi-linear. Although the clamp 9 lacks a transmission mechanism, the operating principle is the same as that of the clamp described previously. The clamp 9 is bi-stable, the jaws 13 being drawn alternately toward their opening or toward their closing, depending on their position (respectively of release, FIG. 10, or of gripping, FIG. 11), by the return force produced by the magnetic return device 17.

From the release position, the closing of the clamp 9 is performed by the penetration into its housing 14 of the preform 2 that has just pushed the levers 35, which thus cause the jaws 13 to pivot around their respective axes A1, A2 of rotation until exceeding the dead point (magnetic axes of the magnets 18, 19 that are combined). Consequently, the return force exerted by the magnetic return device 17 exerts on each jaw 13 a torque that tends to tighten it around the preform 2. The gripping position is stable, the preform 2 itself producing a unilateral stop that limits the travel of the jaws 13.

Conversely, from the gripping position, a force exerted on at least one of the jaws 13 is necessary to cause it to open. In the example illustrated, one of the jaws 13 carries a roller 33 that is able to work with a cam 34 (in dotted lines in FIG. 10) that is located in the vicinity of the unloading point from the wheel 1. The engagement of the roller 33 with the cam 34 causes the pivoting of this jaw 13 (and therefore the ejection of the preform 2 by way of the lever 35, the preform 2 itself causing the pivoting of the other jaw 13 and therefore contributing to its own ejection by way of the corresponding lever 35), against the return force of the magnetic return device 17, until passing the dead point. Consequently, the return force is reversed and contributes to the opening of the jaws 13 (and therefore to the ejection of the preform 2 by way of the levers 35), until the release position is attained. The travel of the jaws 13 is unilaterally limited, in this position, by their stopping against one another at rear ends 36, as illustrated in FIG. 10.

The clamp 9 that has just been described offers several advantages.

First, it lacks a mechanical spring, benefitting its weight. The magnets 18, 19 certainly have weight, but it is possible to minimize it, for example by using rare earth magnets, of the neodymium-iron-boron type, which generate powerful and lasting magnetic fields for a limited weight.

The reduction of the weight of the clamp 9 makes it possible to reduce the inertia of the wheel 1, benefitting, first, its reliability and its durability and, then, rates of production.

Then, since the spring effect offered by the magnetic return device 17 is performed without contact, a reduction of the zones of friction by contact within the clamp 9 results therefrom (in particular, there is no contact between the magnets 18, 19). As a result, there is a reduction of the wear and of the mechanical fatigue of the movable components of the clamp 9, benefitting its reliability and its durability.

Finally, since the clamp 9 is bi-stable, the action of the roller 33 on the cam 34 can be limited to a zone of the wheel 1 that is restricted to the vicinity of the unloading point, benefitting the reduction of wear, the simplicity and the reliability of the entire production line.

The invention claimed is:

1. Clamp (9) for gripping a hollow body (2), which comprises:
   a clamp body (12);
   a pair of jaws (13) mounted articulated in relation to the clamp body (12) around respective parallel axes (A1, A2) of rotation, between a release position in which the jaws (13) are separated from one another to accommodate or release a hollow body (2), and a gripping position in which the jaws (13) are brought close to one another and define a housing (14) for the hollow body (2) so as to clamp it;
   a magnetic return device (17) comprising at least one pair of magnets (18, 19) in magnetic opposition, able to draw the jaws (13) toward their release position or, conversely, toward their gripping position;
   wherein the magnetic return device (17) comprises at least one fixed magnet (18) that is integral with the clamp body (12), having a magnetic axis (M1) that is parallel to the axis (A1, A2) of rotation of the jaws (13), and at least one movable magnet (19) that is coupled to at least one of the jaws (13), having a magnetic axis (M2) that is parallel to the axis (A1, A2) of rotation of the jaws (13); and wherein each movable magnet (19) can be moved in relation to the clamp body (12) between a first end position in which the movable magnet (19) is off-axis in relation to the fixed magnet (18) and draws at least one of the jaws (13) toward its release position, and a second end position in which the movable magnet (19) is off-axis in relation to the fixed magnet (18) in a direction that is opposite to the first end position and draws at least this jaw (13) toward its gripping position.

2. Clamp (9) according to claim 1, further comprising:
an actuator (20) carrying the movable magnet (19), this actuator (20) being movable in translation relative to the clamp body (12) between a deployed position, corresponding to the release position of the jaws (13), in which a front end (29) of the actuator (20) projects into the housing (14), and a retracted position, corresponding to the gripping position of the jaws (13), in which the actuator (20) is retracted in relation to the housing (14);
a pair of link rods (21) each coupling a jaw (13) to the actuator (20).

3. Clamp (9) according to claim 2, wherein each link rod (21) is, by an outer end (23), articulated relative to a jaw (13) and, by an inner end (24), articulated relative to the actuator (20).

4. Clamp (9) according to claim 3, wherein, by their inner ends (24), the link rods are articulated relative to the actuator (20) around a common axis.

5. Clamp (9) according to claim 4, wherein the magnetic return device (17) comprises a pair of fixed magnets (18) placed on either side of the actuator (20), opposite to the movable magnet (19).

6. Clamp (9) according to claim 5, further comprising a roller (33) that is integral with the actuator (20), able to work with a cam (34).

7. Clamp (9) according to claim 4, further comprising a roller (33) that is integral with the actuator (20), able to work with a cam (34).

8. Clamp (9) according to claim 3, wherein the magnetic return device (17) comprises a pair of fixed magnets (18) placed on either side of the actuator (20), opposite to the movable magnet (19).

9. Clamp (9) according to claim 8, further comprising a roller (33) that is integral with the actuator (20), able to work with a cam (34).

10. Clamp (9) according to claim 3, further comprising a roller (33) that is integral with the actuator (20), able to work with a cam (34).

11. Clamp (9) according to claim 2, wherein the magnetic return device (17) comprises a pair of fixed magnets (18) placed on either side of the actuator (20), opposite to the movable magnet (19).

12. Clamp (9) according to claim 11, wherein the movable magnet (19) is spherical.

13. Clamp (9) according to claim 12, further comprising a roller (33) that is integral with the actuator (20), able to work with a cam (34).

14. Clamp (9) according to claim 11, further comprising a roller (33) that is integral with the actuator (20), able to work with a cam (34).

15. Clamp (9) according to claim 2, further comprising a roller (33) that is integral with the actuator (20), able to work with a cam (34).

16. Clamp (9) according to claim 1, wherein each jaw (13) carries a movable magnet (19) and is integral with a lever (35) that, in the gripping position of the jaw (13), is retracted relative to the housing (14) and that, in the release position of the jaw (13), projects into the housing (14).

* * * * *